US012793253B2

(12) United States Patent
Hong et al.

(10) Patent No.: US 12,793,253 B2
(45) Date of Patent: Nov. 10, 2026

(54) OBJECT RECOGNITION METHOD AND APPARATUS, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Zheming Hong, Shenzhen (CN); Shaoming Wang, Shenzhen (CN); Runzeng Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 325 days.

(21) Appl. No.: 18/378,569

(22) Filed: Oct. 10, 2023

(65) Prior Publication Data

US 2024/0037780 A1 Feb. 1, 2024

Related U.S. Application Data

(63) Continuation of application No. PCT/CN2023/080982, filed on Mar. 13, 2023.

(30) Foreign Application Priority Data

Mar. 23, 2022 (CN) ......................... 202210295192.8

(51) Int. Cl.
*G06T 7/70* (2017.01)
*G06T 7/50* (2017.01)
*G06V 10/24* (2022.01)

(52) U.S. Cl.
CPC .................. *G06T 7/70* (2017.01); *G06T 7/50* (2017.01); *G06V 10/242* (2022.01); *G06T 2207/10048* (2013.01); *G06V 2201/07* (2022.01)

(58) Field of Classification Search
CPC ... G06T 7/70; G06T 2207/10048; G06T 7/30; G06T 7/55; G06T 7/80
See application file for complete search history.

(56) References Cited

U.S. PATENT DOCUMENTS

2014/0346359 A1 11/2014 Holliday
2015/0310669 A1 * 10/2015 Kamat .................. G06T 19/006 345/633

FOREIGN PATENT DOCUMENTS

CN 106548489 A 3/2017
CN 107341473 B 7/2018
(Continued)

OTHER PUBLICATIONS

Tencent Technology, WO, PCT/CN2023/080982, Jun. 20, 2023, 4 pgs.
(Continued)

*Primary Examiner* — Sumati Lefkowitz
*Assistant Examiner* — Connor L Hansen
(74) *Attorney, Agent, or Firm* — Morgan, Lewis & Bockius LLP

(57) ABSTRACT

This application discloses an object recognition method performed by an electronic device. The method includes: simultaneously acquiring an infrared image and a visible image for a target object; obtaining depth information of reference pixel points in the infrared image relative to the target object; obtaining depth information of other pixel points in the infrared image relative to the target object according to position information of the reference pixel points in the infrared image and the depth information of the reference pixel points in the infrared image; aligning the pixel points in the infrared image with pixel points in the visible image based on the depth information of the pixel points in the infrared image; and performing object recog-
(Continued)

nition on the target object based on the aligned infrared image and visible image, to obtain an object recognition result of the target object.

16 Claims, 9 Drawing Sheets

(56) References Cited

FOREIGN PATENT DOCUMENTS

| | | | | |
|---|---|---|---|---|
| CN | 110956114 A | | 4/2020 | |
| CN | 111191644 A | | 5/2020 | |
| CN | 111667520 A | | 9/2020 | |
| CN | 111738970 A | | 10/2020 | |
| CN | 112434780 A | | 3/2021 | |
| CN | 112581545 A | | 3/2021 | |
| CN | 112861729 A | | 5/2021 | |
| CN | 113111723 A | | 7/2021 | |
| CN | 112581545 B | * | 8/2023 | G06T 7/80 |
| KR | 20200094259 A | | 8/2020 | |
| WO | WO 2016192437 A1 | | 12/2016 | |
| WO | WO 2020088290 A1 | | 5/2020 | |
| WO | WO 2021253173 A1 | | 12/2021 | |
| WO | WO 2022016331 A1 | | 1/2022 | |

OTHER PUBLICATIONS

Tencent Technology, ISR, PCT/CN2023/080982, Jun. 20, 2023, 2 pgs.

Tencent Technology, Japanese Office Action, JP Patent Application No. 2024-555038, Aug. 28, 2025, 11 pgs.

Shunsuke Harasaki et al., "Virtual Object Overlay onto Uncalibrated Camera Image for Augmented Reality", Systems and Computers in Japan, vol. 34, Issue 5, Mar. 2003, 11 pgs.

Xu Liang et al., "Innovative Contactless Palmprint Recognition System Based on Dual-Camera Alignment", IEEE Transactions on Systems, Man, and Cybernetics: Systems, vol. 52, Issue: 10, Oct. 2022, 14 pgs.

Tencent Technology, IPRP, PCT/CN2023/080982, Sep. 24, 2024, 5 pgs.

Tencent Technology, Extended European Search Report, EP Patent Application No. 23773638.4, Jan. 29, 2025, 8 pgs.

Jiayi Ma et al., "Infrared and Visible Image Fusion Methods and Applications: A Survey", Science Direct, Information Fusion, vol. 45, Jan. 2019, 26 pgs.

* cited by examiner

OBJECT RECOGNITION METHOD AND APPARATUS, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2023/080982, entitled "OBJECT RECOGNITION METHOD AND APPARATUS, ELECTRONIC DEVICE, COMPUTER-READABLE STORAGE MEDIUM, AND COMPUTER PROGRAM PRODUCT" filed on Mar. 13, 2023, which claims priority to Chinese Patent Application No. 202210295192.8, entitled "OBJECT RECOGNITION METHOD AND APPARATUS, ELECTRONIC DEVICE, COMPUTER-READABLE STORAGE MEDIUM, AND COMPUTER PROGRAM PRODUCT" filed on Mar. 23, 2022, all of which is incorporated herein by reference in its entirety.

FIELD OF THE TECHNOLOGY

This application relates to the field of computer technologies, and in particular, to an object recognition method and apparatus, an electronic device, a computer-readable storage medium, and a computer program product.

BACKGROUND OF THE DISCLOSURE

With the development of computer technologies, image processing technologies have been applied to more fields. For example, the biometric recognition technology is widely applied to many fields such as access control and attendance, information security, and electronic certificates. Specifically, the biometric recognition technology is a technology that automatically extracts biometric features from a to-be-recognized image, and then performs identity verification according to these features. In the process of biometric recognition, an infrared image and a visible image for a target object are usually acquired. The infrared image may be used for living detection on the target object. Before living detection, pixel alignment processing needs to be performed on the acquired infrared image and visible image.

In the related art, the pixel alignment processing on the infrared image and the visible image mainly depends on a depth map, but this method is not suitable for recognition scenarios lacking a depth map.

SUMMARY

Embodiments of this application provide an object recognition method and apparatus, an electronic device, a computer-readable storage medium, and a computer program product, which can implement pixel alignment on an infrared image and a visible image in scenarios lacking a depth map, thereby performing object recognition.

An embodiment of this application provides an object recognition method, performed by an electronic device, the method including:

object;

simultaneously acquiring an infrared image and a visible image for a target obtaining depth information of reference pixel points in the infrared image relative to the target object;

obtaining depth information of other pixel points in the infrared image relative to the target object according to position information of the reference pixel points in the infrared image and the depth information of the reference pixel points in the infrared image;

aligning the pixel points in the infrared image with pixel points in the visible image based on the depth information of the pixel points in the infrared image; and performing object recognition on the target object based on the aligned infrared image and visible image, to obtain an object recognition result of the target object.

An embodiment of this application provides an electronic device, including a processor and a memory, the memory storing a plurality of instructions, and the processor loading the instructions and causing the electronic device to perform the steps in the object recognition method provided by the embodiments of this application.

An embodiment of this application further provides a non-transitory computer-readable storage medium, storing a plurality of instructions that, when executed by a processor of an electronic device, cause the electronic device to implement the steps in the object recognition method provided by the embodiments of this application.

In the embodiments of this application, the depth information of the pixel points is obtained from the infrared image and the depth information is given to the pixel points in the visible image through mapping between the infrared image and the visible image, so that the depth information can be restored through the low-cost images acquired by the sensors based on infrared light and visible light, and the object recognition can be supported without relying on the high-cost depth sensor, thereby having a wide range of application scenarios.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The embodiments of this application provide an object recognition method and related equipment. The related equipment may include an object recognition apparatus, an electronic device, a non-transitory computer-readable storage medium, and a computer program product. The object recognition apparatus may be specifically integrated in an electronic device, and the electronic device may be a device such as a terminal or a server.

It can be understood that the object recognition method of the embodiments of this application may be performed on the terminal, may be performed on the server, and may be performed jointly by the terminal and the server. The above examples are not to be construed as limiting this application.

Figure 1A:
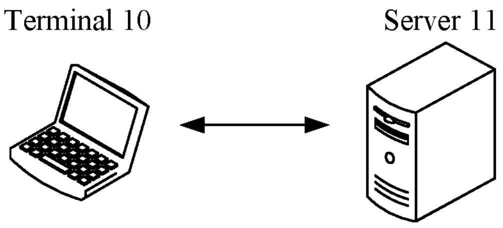
FIG. 1A is a schematic scenario diagram of an object recognition method according to an embodiment of this application.

As shown in FIG. 1A, for example, the terminal and the server jointly perform the object recognition method. An object recognition system provided by the embodiments of this application includes a terminal 10, a server 11, and the like; The terminal 10 and the server 11 are connected through a network such as a wired or wireless network. The object recognition apparatus may be integrated in the terminal.

The terminal 10 may be configured to: acquire an infrared image and a visible image for a target object; determine reference pixel points from pixel points in the infrared image, and obtain depth information of the reference pixel points relative to the target object; obtain depth information of the pixel points in the infrared image relative to the target object according to position information of the reference pixel points in the infrared image and the depth information; perform position mapping on the pixel points in the infrared image based on the depth information corresponding to the pixel points in the infrared image, to obtain mapping point position information corresponding to the pixel points in the infrared image in the visible image; align the pixel points in the infrared image and the visible image according to the mapping point position information; and transmitting the aligned infrared image and visible image to the server 11 to perform object recognition on the target object by the server 11, to obtain an object recognition result of the target object. The terminal 10 may include a mobile phone, a smart TV, a tablet computer, a notebook computer, a personal computer (PC), or the like. A client may also be disposed on the terminal 10, and the client may be an application client, a browser client, or the like.

The server 11 may be configured to: receive the aligned infrared image and visible image transmitted by the terminal 10, and perform object recognition on the target object based on the aligned infrared image and the visible image, to obtain the object recognition result of the target object; and transmit the object recognition result to the terminal 10. The server 11 may be a single server or may be a server cluster including a plurality of servers or a cloud server. In the object recognition method or apparatus disclosed in this application, a plurality of servers may form a blockchain network, and the servers are nodes on the blockchain network.

The object recognition steps performed by the server 11 may also be performed by the terminal 10.

The object recognition method provided by the embodiments of this application involves the computer vision technology in the field of artificial intelligence (AI). AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making. The AI technology is a comprehensive discipline, and relates to a wide range of fields including both hardware-level technologies and software-level technologies. AI software technologies mainly include several major directions such as a computer vision technology, a speech processing technology, a natural language processing technology, machine learning/deep learning, automatic driving, and intelligent transportation.

Detailed descriptions are separately provided below. The sequence numbers of the following embodiments are not intended to limit preference orders of the embodiments.

The embodiments of this application are described from the perspective of an object recognition apparatus. The object recognition apparatus may be specifically integrated in an electronic device. The electronic device may be a device such as a server or a terminal.

It can be understood that in specific implementations of this application, related data such as user information are involved. When the above embodiments of this application are applied to specific products or technologies, user permission or consent is required, and the acquisition, use, and processing of the related data need to comply with relevant laws, regulations, and standards of relevant countries and regions.

The object recognition method of the embodiments of this application may be applied to various scenarios requiring object recognition, such as palm-brushing payment and access control attendance. The embodiments of this application may be applied to various scenarios such as cloud technology, artificial intelligence, intelligent transportation, and assisted driving.

Figure 1B:
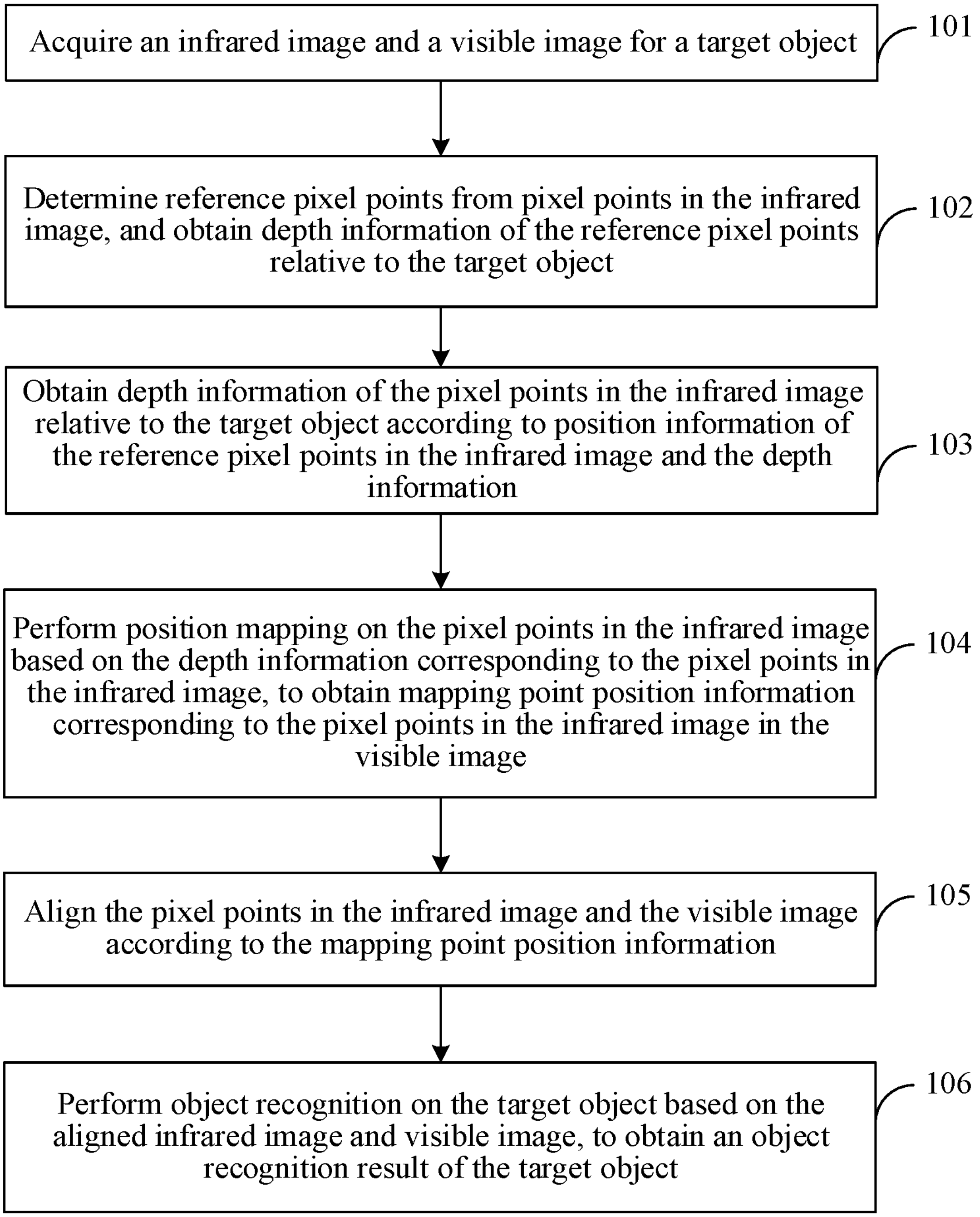
FIG. 1B is a flowchart of an object recognition method according to an embodiment of this application.

As shown in FIG. 1B, the specific process of the object recognition method may be as follows:

Step 101. Acquire an infrared image and a visible image for a target object.

The target object may be an object requiring biometric recognition, which may be palmprint information corresponding to a human body or a human face. This is not limited in the embodiments of this application.

The infrared image may be specifically an infrared image imaged in pan-infrared light and acquired by an infrared sensor, and may be used for living detection on the target object. The visible image may be specifically a two-dimensional color image imaged by natural light and acquired by an image sensor, and may be used for identity recognition on the target object. In the embodiments of this application, the infrared image and the visible image for the target object may be acquired at the same time, so that the infrared image corresponds to the visible image.

Specifically, in the process of biometric recognition, it is generally necessary to obtain a depth image of the target object; The depth image may be specifically a depth map obtained by acquiring speckle structured infrared light by infrared sensor, and then analyzing the speckle by a depth unit. In three-dimensional (3D) computer graphics and computer vision, the depth map is an image or image channel, which contains information related to the distance from the surface of the acquired scene object to the viewpoint. Each pixel point of the depth map represents the vertical distance between the plane of the depth camera and the plane of the photographed object, which is usually represented by 16 bits in millimeters. The depth image in object recognition scenarios may generally be used for: living detection and auxiliary identity recognition. Using the depth image to assist identity recognition can greatly improve the accuracy and robustness of identity recognition.

The living detection is a detection method to determine whether the target object is a real person, a photo, or a head model. Generally, whether the target object is a photo can be determined by the depth image, and whether the target object is a silicone head model can be determined by the brightness of the infrared image.

Figure 1C:
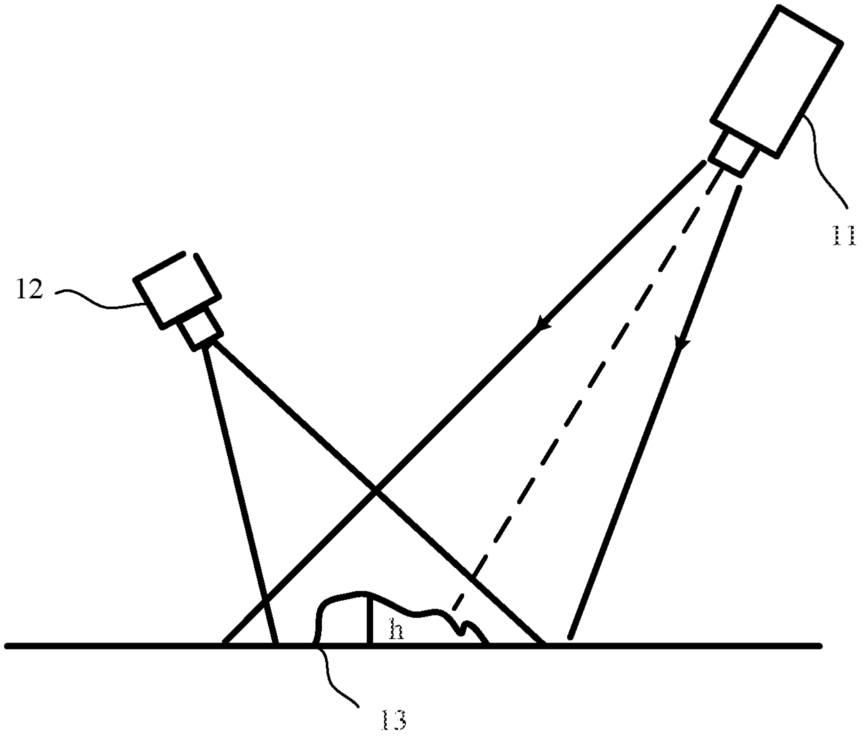
FIG. 1C is a schematic structural diagram of a speckle structured light imaging system according to an embodiment of this application.

The speckle structured light is lattice light projected by an infrared speckle projector and arranged according to a structure law. As shown in FIG. 1C, the speckle structured light imaging system is formed by an infrared laser projector 11 and an infrared sensor 12. The lattice light is projected to the surface 13 of the object (that is, the reference sample). After imaging, the infrared sensor can restore the 3D coordinate information of the object surface according to the triangulation principle, thereby obtaining the depth image.

Compared with the depth image, the point cloud image records the 3D coordinate information of the object in the real world, which can be calculated by the depth image and camera parameters. Although the depth image also contains the depth information of the object, the horizontal and vertical coordinates of a point in the depth image are the pixel point coordinates in the imaging plane (hereinafter also called the pixel plane), while the point cloud image records the physical coordinates of the point in the real world. The point cloud image can be displayed in the 3D rendering engine, reflecting the 3D position relationship of each point.

In the related art, Red Green Blue-Depth (RGB-D) data is usually used for identity recognition. RGB is a color mode, which is a color standard in the industry. By adjusting the three color channels of Red, Green and Blue and superimposing them with each other, various colors can be obtained. RGB is the color representing the three channels of Red, Green and Blue. D is the abbreviation of the depth map. In three-dimensional computer graphics, the depth map is an image or image channel that contains information about the distance from the surface of the scene object to the viewpoint. The depth map is similar to a gray image, except that the pixel value of each pixel point is the actual distance from the sensor to the object. Usually, the RGB image (that is, visible image) and the depth image are registered, and therefore there is a one-to-one correspondence between the pixel points of the RGB image and the depth image.

However, in some identity recognition scenarios, only visible images and infrared images can be acquired, but depth images are lacking. Therefore, it is impossible to implement pixel-level alignment of three images by relying on depth images. The pixel-level alignment of three images refers to the one-to-one correspondence among pixel points of the visible image, the infrared image, and the depth image. This application can provide an object recognition method capable of implementing pixel-level alignment of a visible image and an infrared image without relying on a depth image.

The object recognition method provided by this application may be applied to the palmprint recognition field, and the palmprint recognition is a biometric recognition technology. Through palmprint recognition, the palmprint information of the target object can be extracted. The palmprint information may specifically refer to the palm image information from the end of finger to the wrist. The palmprint features of different objects are different, and therefore identity authentication can be performed according to the palmprint information.

The biometric recognition technology is specifically a technology that combines computer with high-tech means such as optics, acoustics, biosensors, and biometric principles closely, and uses the inherent physiological characteristics (such as fingerprints, faces, and irises) and behavioral characteristics (such as handwriting, voice, and gait) of the human body to identify individuals.

Step 102. Determine reference pixel points from pixel points in the infrared image, and obtain depth information of the reference pixel points relative to the target object.

In some embodiments, three pixel points that are not on the same line may be arbitrarily selected as reference pixel points from the pixel points in the infrared image.

For example, the reference pixel points include at least three pixel points that are not on the same line.

In a specific scenario, the depth information of the reference pixel points relative to the target object may be specifically obtained by using a proximity sensor (Psensor). Specifically, the number of the reference pixel points may be determined firstly, and the number of the Psensors may be determined based on the number of the reference pixel points. Each Psensor is configured to obtain the depth information of one reference pixel point. For the principle of measuring the depth information by the Psensor, reference may be made to dToF. Direct Time-of-Flight (dToF) is to measure the distance directly according to the time difference between pulse emission and reception, while the Psensor can calculate the distance between the imaging plane and the object surface of the target object according to the round-trip time between the emitted light and the object surface and the propagation speed of light, and the distance is the depth information.

For example, when there is no depth camera, if the target object is planar (such as palm), a Psensor can be used as an alternative to deduce the plane depth value of the target object, and three Psensors can be installed at positions not on the same line in the pixel plane of the infrared image, to obtain the depth information corresponding to three or more reference pixel points by using the Psensors.

Step 103. Obtain depth information of the pixel points in the infrared image relative to the target object according to position information of the reference pixel points in the infrared image and the depth information.

Specifically, in the embodiments of this application, according to the position information and the depth information of the reference pixel points, a pixel depth of the pixel plane of the infrared image, that is, the depth information of the pixel points in the infrared image relative to the target object, can be obtained.

For example, in the embodiments of this application, step 103 may include: determining mapping point spatial position information corresponding to the reference pixel points in an imaging space of the infrared image according to the position information of the reference pixel points in the infrared image and the depth information; constructing a plane calibration equation corresponding to the target object based on the mapping point spatial position information; and obtaining depth information of the pixel points in the infrared image relative to the target object according to the plane calibration equation and a position relationship between the pixel points in the infrared image and the reference pixel points.

In some embodiments, the step of "determining mapping point spatial position information corresponding to the reference pixel points in an imaging space of the infrared image according to the position information of the reference pixel points in the infrared image and the depth information" may include: performing position transformation on position information of the reference pixel points in the infrared image according to the position transformation relationship between the pixel plane of the infrared image and the imaging space, to obtain mapping point initial position information corresponding to the reference pixel points in the imaging space of the infrared image; and determining the mapping point spatial position information corresponding to the reference pixel points in the imaging space of the infrared image according to the depth information corresponding to the reference pixel points and the mapping point initial position information.

The position transformation relationship between the pixel plane of the infrared image and the imaging space may be specifically characterized by the camera internal parameters of the camera sensor corresponding to the infrared image. In the embodiments of this application, a pixel coordinate system corresponding to the infrared image can be constructed on the pixel plane of the infrared image, where the pixel coordinate system may be a two-dimensional coordinate system, and a camera coordinate system corresponding to the infrared image can be constructed in the imaging space of the infrared image, where the camera coordinate system may be a three-dimensional coordinate system.

Figure 1D:
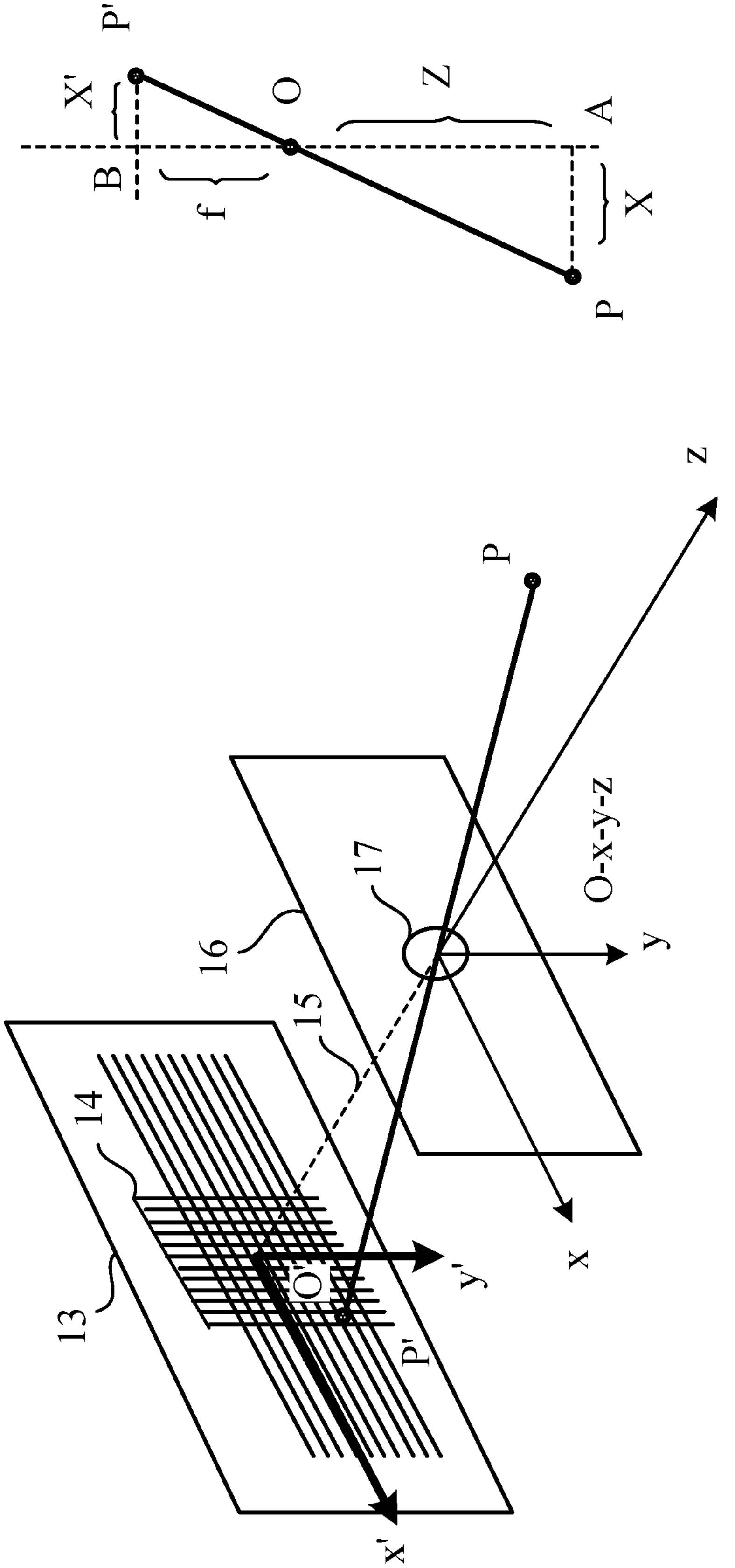
FIG. 1D is a schematic diagram of a pinhole imaging model according to an embodiment of this application.

In a simplified camera model shown in FIG. 1D, the camera model is specifically a pinhole imaging model, and the camera internal parameters are parameters used to describe the transformation relationship between three-dimensional spatial coordinates (that is, coordinates on a pixel plane 14) when a real-world object is imaged on the camera sensor and two-dimensional pixel point coordinates in a physical imaging plane 13 after imaging. The depth image and the point cloud image in the above embodiment may also be transformed to each other through the camera internal parameters.

The camera coordinate system refers to a coordinate system in which an optical center O 17 of a camera 16 is taken as a coordinate origin, and optical axes are z-axis, x-axis, and y-axis parallel to x-axis and y-axis of the imaging plane. The 3D coordinates of the point cloud image obtained by the transformation of the depth image and the camera internal parameters are the coordinates in the camera coordinate system (O-x-y-z).

Specifically, the camera internal parameters of the camera sensor corresponding to the infrared image can be obtained according to the position transformation relationship between the pixel plane of the infrared image and the imaging space, and then position transformation can be performed on the position information of the reference pixel points in the infrared image according to the camera internal parameters. The processing process may be as shown in Formula (1):

$$z_c * \begin{bmatrix} u \\ v \\ 1 \end{bmatrix} = \begin{bmatrix} f_x & 0 & u_0 \\ 0 & f_y & v_0 \\ 0 & 0 & 1 \end{bmatrix} * \begin{bmatrix} x_c \\ y_c \\ z_c \end{bmatrix} \tag{1}$$

$f_x$, $f_y$, $u_0$, and $v_0$ are camera internal parameters. Specifically, $f_x$ represents a focal length 15 in the x-axis direction, f y represents a focal length in the y-axis direction, and $u_0$ and $v_0$ are main point positions. The position information of the reference pixel points in the infrared image may be represented as (u, v), and the depth information corresponding to the reference pixel points is $z_c$. Through Formula (1), the mapping point initial position information $x_c$ and $y_c$ corresponding to the reference pixel points in the imaging space of the infrared image can be obtained. $x_c$ and $y_c$ are the x-axis coordinates and y-axis coordinates included in the mapping point spatial position information corresponding to the reference pixel points in the imaging space of the infrared image.

After the mapping point initial position information $x_c$ and $y_c$ are obtained, the mapping point spatial position information ($x_c$, $y_c$, $z_c$) corresponding to the reference pixel points in the imaging space of the infrared image can be constructed based on the depth information corresponding to the reference pixel points.

The step of "constructing a plane calibration equation corresponding to the target object based on the mapping point spatial position information" may include: setting an initial plane calibration equation corresponding to the target object, where the initial plane calibration equation includes at least one calibration parameter; analyzing the at least one calibration parameter based on the mapping point spatial position information to obtain an analyzed calibration parameter; and updating the initial plane calibration equation according to the analyzed calibration parameter, to obtain the plane calibration equation corresponding to the target object.

The initial plane calibration equation may be set as AX+BY+CZ+D=0, where A, B, C, and D are calibration parameters. The mapping point spatial position information is substituted into the initial plane calibration equation to solve the initial plane calibration equation, to analyze the calibration parameters to obtain specific values of A, B, C, and D, that is, analyzed calibration parameters, thereby obtaining the plane calibration equation of the target object.

In a specific embodiment, position information of three reference pixel points m, n, and p in the infrared image may be represented as m=(x1, y1), n=(x2, y2), and p=(x3, y3). According to Formula (1) in the above embodiment, mapping point spatial position information corresponding to the three reference pixel points in the imaging space of the infrared image can be calculated and represented as M=(X1, Y1, Z1), N=(X2, Y2, Z2), and P=(X3, Y3, Z3), respectively; Then, M=(X1, Y1, Z1), N=(X2, Y2, Z2), P=(X3, Y3, Z3) are substituted into Formula (2) as follows:

$$AX + BY + CZ + D = 0 \tag{2}$$

By solving the coefficients A, B, C, and D in the above formula, the plane calibration equation of the target object can be obtained.

In the embodiments of this application, the step of "obtaining depth information of the pixel points in the infrared image relative to the target object according to the plane calibration equation and a position relationship between the pixel points in the infrared image and the reference pixel points" may include: performing interpolation operation on position information of the pixel points in the infrared image and the position information of the reference pixel points, to obtain a position relationship parameter between the pixel points in the infrared image and the reference pixel points; and determining the depth information of the pixel points in the infrared image relative to the target object according to the position relationship parameter and the plane calibration equation.

In a specific embodiment, position information of three reference pixel points m, n, and p in the infrared image may be represented as m=(x1, y1), n=(x2, y2), and p=(x3, y3). When depth information of another pixel point k on the infrared image needs to be obtained, position relationship parameters between the pixel points and the reference pixel points in the infrared image can be calculated by using the three-point interpolation of m, n, and p. Position information of the pixel point k in the infrared image is (x4, y4), and the interpolation process may be as shown in Formula (3) and Formula (4):

$$x4 = x1 + \alpha * (x2 - x1) + \beta * (x3 - x1) \quad (3)$$

$$y4 = y1 + \alpha * (y2 - y1) + \beta * (y3 - y1) \quad (4)$$

The coordinates of the pixel points m, n, p, and k can be substituted into Formula (3) and Formula (4), so that the position relationship parameters α and β between the pixel points and the reference pixel points in the infrared image can be obtained.

In the embodiments of this application, the step of "determining the depth information of the pixel points in the infrared image relative to the target object according to the position relationship parameter and the plane calibration equation" may include: performing interpolation operation on the mapping point spatial position information corresponding to the reference pixel points in the imaging space of the infrared image according to the position relationship parameter, to obtain mapping point initial position information corresponding to the pixel points in the infrared image in the imaging space of the infrared image; and determining the depth information of the pixel points in the infrared image relative to the target object according to the plane calibration equation and the mapping point initial position information.

In an embodiment, mapping points corresponding to the three reference pixel points m, n, and p in the imaging space of the infrared image are M, N, and P, and spatial position information of the mapping point is referred to as mapping point spatial position information, which is M=(X1, Y1, Z1), N=(X2, Y2, Z2), and P=(X3, Y3, Z3), respectively. The x-axis coordinates and y-axis coordinates of the three pieces of mapping point spatial position information can be substituted into the above Formula (3) and Formula (4) to obtain mapping point initial position information X4 and Y4 corresponding to the pixel point k in the imaging space of the infrared image. X4 and Y4 are specifically the x-axis coordinates and y-axis coordinates of the mapping point spatial position information corresponding to the pixel point k in the imaging space of the infrared image.

After the mapping point initial position information X4 and Y4 are obtained, the mapping point spatial position information (X4, Y4, Z4) corresponding to the pixel point k in the imaging space of the infrared image can be obtained by substituting the mapping point initial position information X4 and Y4 into Formula (2) in the above embodiment, that is, the depth information Z4 of the pixel point k relative to the target object can be obtained. By analogy, the depth information corresponding to the pixel points in the infrared image can be obtained.

Step 104. Perform position mapping on the pixel points in the infrared image based on the depth information corresponding to the pixel points in the infrared image, to obtain mapping point position information corresponding to the pixel points in the infrared image in the visible image.

In the embodiments of this application, the step of "performing position mapping on the pixel points in the infrared image based on the depth information corresponding to the pixel points in the infrared image, to obtain mapping point position information corresponding to the pixel points in the infrared image in the visible image" may include: mapping the pixel points in the infrared image to an imaging space of the visible image based on the depth information corresponding to the pixel points in the infrared image, to obtain target mapping point spatial position information corresponding to the pixel points in the infrared image in the imaging space; and performing position transformation on the target mapping point spatial position information according to a position transformation relationship between a pixel plane of the visible image and the imaging space, to obtain the mapping point position information corresponding to the pixel points in the infrared image in the visible image.

The position transformation relationship between the pixel plane of the visible image and the imaging space may be specifically characterized by the camera internal parameters of the camera sensor corresponding to the visible image. In the embodiments of this application, a pixel coordinate system corresponding to a color map can be constructed on the pixel plane of the visible image, where the pixel coordinate system may be a two-dimensional coordinate system, and a camera coordinate system corresponding to the color map can be constructed in the imaging space of the visible image, where the camera coordinate system may be a three-dimensional coordinate system.

The camera internal parameters are parameters for describing the transformation relationship between the three-dimensional spatial coordinates of real-world objects when imaged on the camera sensor and the two-dimensional pixel point coordinates in the physical imaging plane after imaging.

Figure 1E:
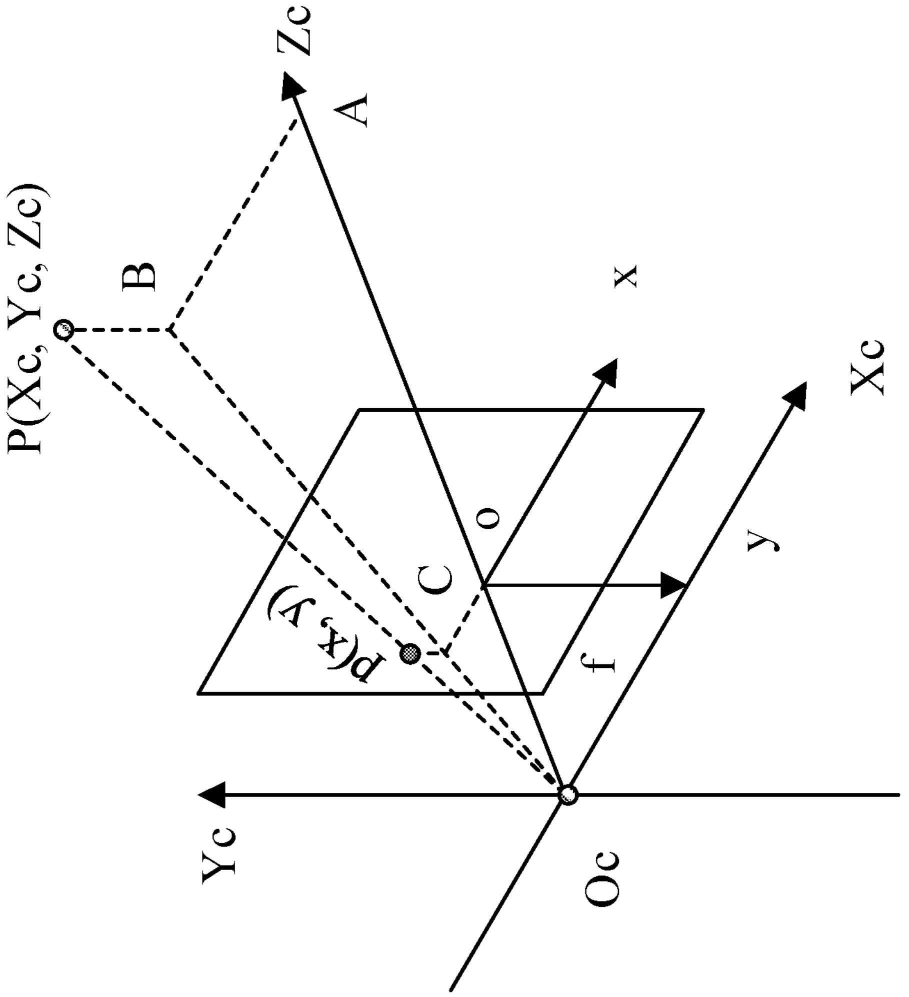
FIG. 1E is a schematic diagram of a transformation relationship between a camera coordinate system and a pixel coordinate system according to an embodiment of this application.

In a specific embodiment, target mapping points in the camera coordinate system corresponding to the color map can be transformed to the pixel coordinate system by using the camera internal parameters. For the transformation between the camera coordinate system and the pixel coordinate system, reference may be made to FIG. 1E, where P $(X_C, Y_C, Z_C)$ is a point in the camera coordinate system, and p (x, y) is a point in the pixel coordinate system. The coordinate transformation relationship between them can be converted by the camera internal parameters.

Specifically, according to the position transformation relationship between the pixel plane of the visible image and the imaging space, the camera internal parameters of the camera sensor corresponding to the visible image can be obtained, and then the position transformation is performed on the target mapping point spatial position information according to the camera internal parameters. The processing process may be as shown in Formula (5):

$$z_c * \begin{bmatrix} u \\ v \\ 1 \end{bmatrix} = \begin{bmatrix} f_x & 0 & u_0 \\ 0 & f_y & v_0 \\ 0 & 0 & 1 \end{bmatrix} * \begin{bmatrix} x_c \\ y_c \\ z_c \end{bmatrix} \tag{5}$$

$f_x$, $f_y$, $u_0$, and $v_0$ are camera internal parameters. Specifically, $f_x$ represents a focal length in the x-axis direction, f y represents a focal length in the y-axis direction, and $u_0$ and $v_0$ are main point position. The target mapping point spatial position information may be represented as ($x_c$, $y_c$, $z_c$). Through Formula (5), the mapping point position information corresponding to the pixel points in the infrared image in the visible image (u, v), that is, the mapping point position information in the pixel coordinate system corresponding to the color map, can be obtained.

In the embodiments of this application, the step of "mapping the pixel points in the infrared image to an imaging space of the visible image based on the depth information corresponding to the pixel points in the infrared image, to obtain target mapping point spatial position information corresponding to the pixel points in the infrared image in the imaging space" may include: obtaining mapping point spatial position information corresponding to the pixel points in the infrared image in an imaging space of the infrared image based on the depth information corresponding to the pixel points in the infrared image; and performing position transformation on the mapping point spatial position information according to a position transformation relationship between the imaging space of the infrared image and the imaging space of the visible image, to obtain the target mapping point spatial position information corresponding to the pixel points in the infrared image in the imaging space of the visible image.

In some embodiments, the step "obtaining mapping point spatial position information corresponding to the pixel points in the infrared image in an imaging space of the infrared image" may be specifically constructing the mapping point spatial position information corresponding to the pixel points in the infrared image in the imaging space of the infrared image based on the depth information corresponding to the pixel points in the infrared image obtained in the step 103 and the mapping point initial position information corresponding to the pixel points in the infrared image in the imaging space of the infrared image.

For example, for each pixel point, depth information corresponding to the pixel point in the infrared image and corresponding mapping point initial position information in the imaging space of the infrared image are combined, as one dimension respectively, into mapping point spatial position information corresponding to the pixel point in the imaging space of the infrared image.

The position transformation relationship between the imaging space of the infrared image and the imaging space of the visible image can be specifically characterized by camera external parameters between the camera sensor corresponding to the infrared image and the camera sensor corresponding to the visible image. In the embodiments of this application, a camera coordinate system corresponding to the infrared image can be constructed in the imaging space of the infrared image, and a camera coordinate system corresponding to the color image can be constructed in the imaging space of the visible image. Both of the two camera coordinate systems are three-dimensional coordinate systems.

Figure 1F:
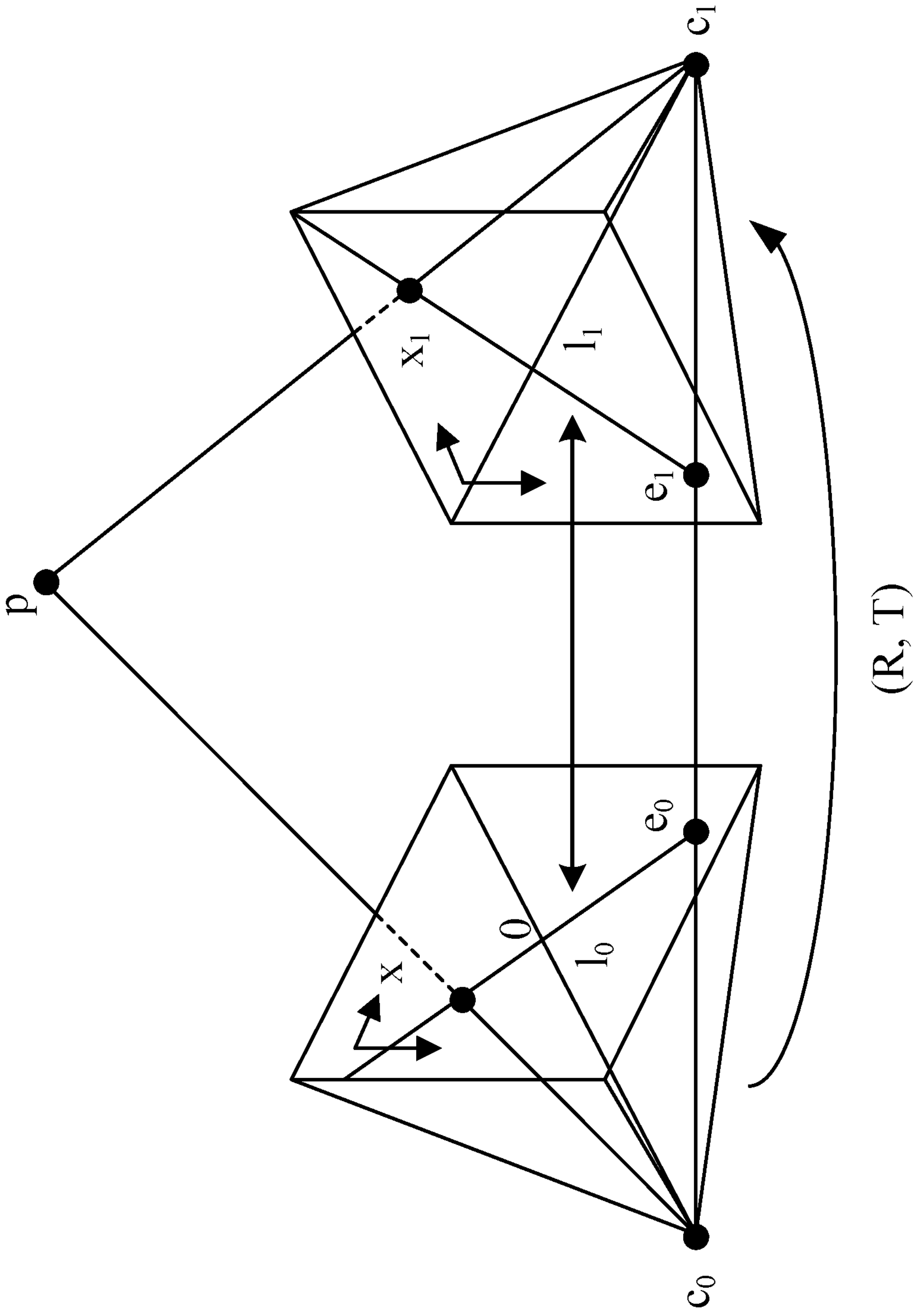
FIG. 1F is a schematic diagram of a relationship between camera coordinate systems according to an embodiment of this application.

As shown in FIG. 1F, the camera external parameters may be parameters for describing the transformation relationship between other three-dimensional coordinate systems and the camera coordinate system. When there are a plurality of cameras, coordinates of an object point in the camera coordinate system of one camera can be transformed to another camera coordinate system through a rotation matrix R and a translation matrix T. The rotation matrix R and a translation matrix T are external parameters between the two cameras, and the camera external parameters describe the transformation relationship between the two camera coordinate systems. $c_0$ and $c_1$ are cameras in two camera coordinate systems, and there are angle and distance offsets between the two cameras, which is similar to the relationship between the world coordinate system and the camera coordinate system. The transformation from the world coordinate system to the camera coordinate system belongs to rigid body transformation: That is, the object does not deform, and therefore only needs to be rotated and translated.

Figure 1G:
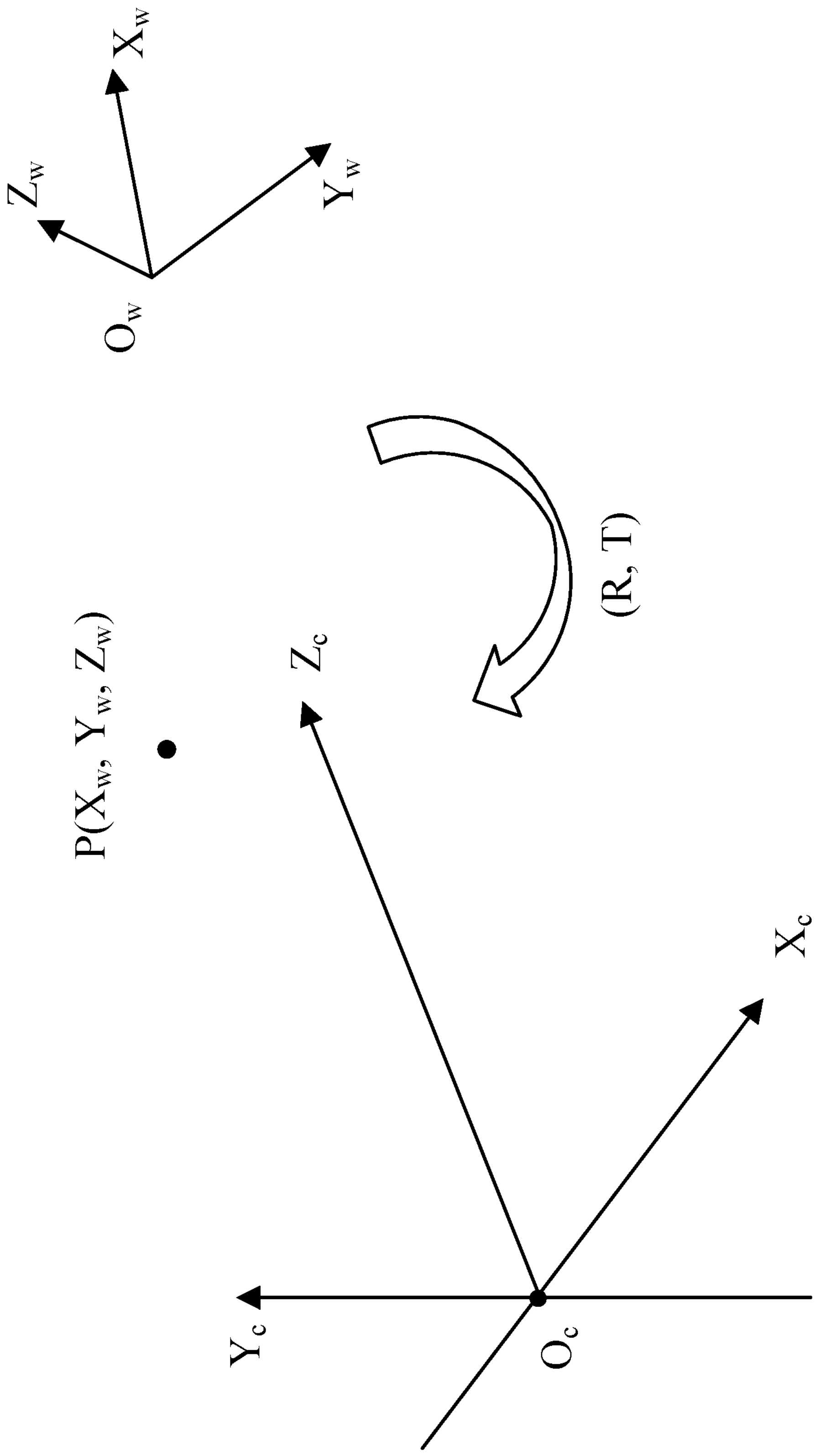
FIG. 1G is a schematic diagram of a relationship between a camera coordinate system corresponding to an infrared image and a camera coordinate system corresponding to a color image according to an embodiment of this application.

In a specific embodiment, the mapping point spatial position information in the camera coordinate system corresponding to the infrared image can be transformed to the camera coordinate system corresponding to the color image by using the camera external parameters between the camera sensor corresponding to the infrared image and the camera sensor corresponding to the visible image. For the transformation between the camera coordinate system corresponding to the infrared image and the camera coordinate system corresponding to the color image, reference may be made to FIG. 1G, where P ($X_w$, $Y_w$, $Z_w$) is a point in the camera coordinate system corresponding to the infrared image, and P ($X_w$, $Y_w$, $Z_w$) can be transformed into a point in the camera coordinate system corresponding to the color map by using the camera external parameters (that is, the rotation matrix R and the translation matrix T).

Specifically, according to the position transformation relationship between the imaging space of the infrared image and the imaging space of the visible image, the camera external parameters between the camera sensor corresponding to the infrared image and the camera sensor corresponding to the visible image can be obtained, and then the position transformation is performed on the mapping point spatial position information according to the camera external parameters. The processing process may be as shown in Formula (6):

$$\begin{bmatrix} x_c \\ y_c \\ z_c \end{bmatrix} = \begin{bmatrix} r_{00} & r_{01} & r_{02} \\ r_{10} & r_{11} & r_{12} \\ r_{20} & r_{21} & r_{22} \end{bmatrix} * \begin{bmatrix} x_w \\ y_w \\ z_w \end{bmatrix} + \begin{bmatrix} t_x \\ t_y \\ t_z \end{bmatrix} \tag{6}$$

In Formula (6), a matrix formed by $r_{00}$ to $r_{22}$ is the rotation matrix R, a matrix formed by $t_x$ to $t_z$ is an offset vector T, and the rotation matrix R and offset vector T are camera external parameters. The mapping point spatial position information may be represented as ($x_w$, $y_w$, $z_w$). Through Formula (6), target mapping point spatial position information ($x_c$, $y_c$, $z_c$) corresponding to the pixel points in the infrared image in the imaging space of the visible image, that is, target mapping point spatial position information in the camera coordinate system corresponding to the color map, can be obtained.

In the embodiments of this application, the step of "obtaining mapping point spatial position information corresponding to the pixel points in the infrared image in an imaging space of the infrared image based on the depth information corresponding to the pixel points in the infrared image" may include: performing position transformation on position information of the pixel points in the infrared image according to the position transformation relationship between the pixel plane of the infrared image and the imaging space, to obtain mapping point initial position information corresponding to the pixel points in the infrared image in the imaging space of the infrared image; and determining the mapping point spatial position information corresponding to the pixel points in the infrared image in the imaging space of the infrared image according to the depth information corresponding to the pixel points in the infrared image and the mapping point initial position information.

The position transformation relationship between the pixel plane of the infrared image and the imaging space may be specifically characterized by the camera internal parameters of the camera sensor corresponding to the infrared image. In the embodiments of this application, a pixel coordinate system corresponding to the infrared image can be constructed on the pixel plane of the infrared image, where the pixel coordinate system may be a two-dimensional coordinate system, and a camera coordinate system corresponding to the infrared image can be constructed in the imaging space of the infrared image, where the camera coordinate system may be a three-dimensional coordinate system.

In a specific embodiment, position information of pixel points in the pixel coordinate system corresponding to the infrared image can be transformed to the camera coordinate system by using the camera internal parameters. For example, point P is a point in the camera coordinate system, and point p is a point in the pixel coordinate system, and the coordinate transformation relationship between the two points may be converted through the camera internal parameters.

Specifically, the camera internal parameters of the camera sensor corresponding to the infrared image can be obtained according to the position transformation relationship between the pixel plane of the infrared image and the imaging space, and then position transformation is performed on the position information of the pixel points in the infrared image according to the camera internal parameters, to obtain the mapping point initial position information corresponding to the pixel points in the infrared image in the imaging space of the infrared image. The processing process may be as shown in Formula (7):

$$z_c * \begin{bmatrix} u \\ v \\ 1 \end{bmatrix} = \begin{bmatrix} f_x & 0 & u_0 \\ 0 & f_y & v_0 \\ 0 & 0 & 1 \end{bmatrix} * \begin{bmatrix} x_c \\ y_c \\ z_c \end{bmatrix} \tag{7}$$

$f_x$, $f_y$, $u_0$, and $v_0$ are camera internal parameters. Specifically, $f_x$ represents a focal length in the x-axis direction, $f_y$ represents a focal length in the y-axis direction, and $u_0$ and $v_0$ are main point positions. The position information of the pixel points in the infrared image may be represented as (u, v), and the depth information corresponding to the pixel points in the infrared image is $z_c$. Through Formula (7), the pixel point initial position information $x_c$ and $y_c$ corresponding to the pixel points in the infrared image in the imaging space of the infrared image can be obtained. $x_c$ and $y_c$ are the x-axis coordinates and y-axis coordinates of the mapping point spatial position information corresponding to the pixel points in the infrared image in the imaging space of the infrared image.

After the mapping point initial position information $x_c$ and $y_c$ are obtained, mapping point spatial position information ($x_c$, $y_c$, $z_c$) corresponding to the pixel points in the infrared image in the imaging space of the infrared image can be constructed based on the depth information $z_c$ corresponding to the pixel points in the infrared image.

Step 105. Align the pixel points in the infrared image and the visible image according to the mapping point position information.

Specifically, each pixel point in the infrared image can be aligned with a corresponding pixel point in the visible image based on the mapping point position information by using the visible image as a reference. That is, the pixel point in the infrared image is aligned with the position of the pixel point representing the same target object in the visible image, and the aligned infrared image corresponds to the position of the pixel point where the same target object is located in the visible image.

For example, keeping the position of the entire visible image in the pixel coordinate system unchanged is keeping the coordinates of the pixel coordinate system in the visible image unchanged, and the position of the entire infrared image in the pixel coordinate system is moved in at least one movement mode of rotation and translation, to transform the coordinates of the pixel points in the infrared image in the pixel coordinate system, so that the coordinates of the infrared image and the pixel point representing the same target object in the visible image are the same.

In a specific scenario of palmprint recognition, because the palm (specifically, the target object) can be regarded as a plane, in the embodiments of this application, the Psensor can be used to calculate a bevel distance corresponding to the palm (specifically, the depth information of the pixel points in the infrared image relative to the target object in the above embodiments), and then pixel alignment is performed on the infrared image and the visible image based on the bevel distance, thereby realizing the pixel-level alignment of two images at low cost.

In the object recognition method provided by this application, reference pixel points can be determined from pixel points of a visible image and depth information of the reference pixel points relative to the target object can be obtained. Then, depth information of the pixel points relative to the target object in the visible image is obtained according to position information of the reference pixel points in the visible image and the depth information. Then, position mapping is performed on the pixel points in the visible image based on the depth information corresponding to the pixel points in the visible image, to obtain mapping point position information corresponding to the pixel points in the visible image in the infrared image. Finally, the pixel points in the infrared image and the visible image are aligned based on the mapping point position information, to perform object recognition. It can be understood that, for the obtaining of the depth information corresponding to the pixel points and the process of the position mapping, reference may be made to the above embodiments correspondingly. Details are not described herein again.

Figure 1H:
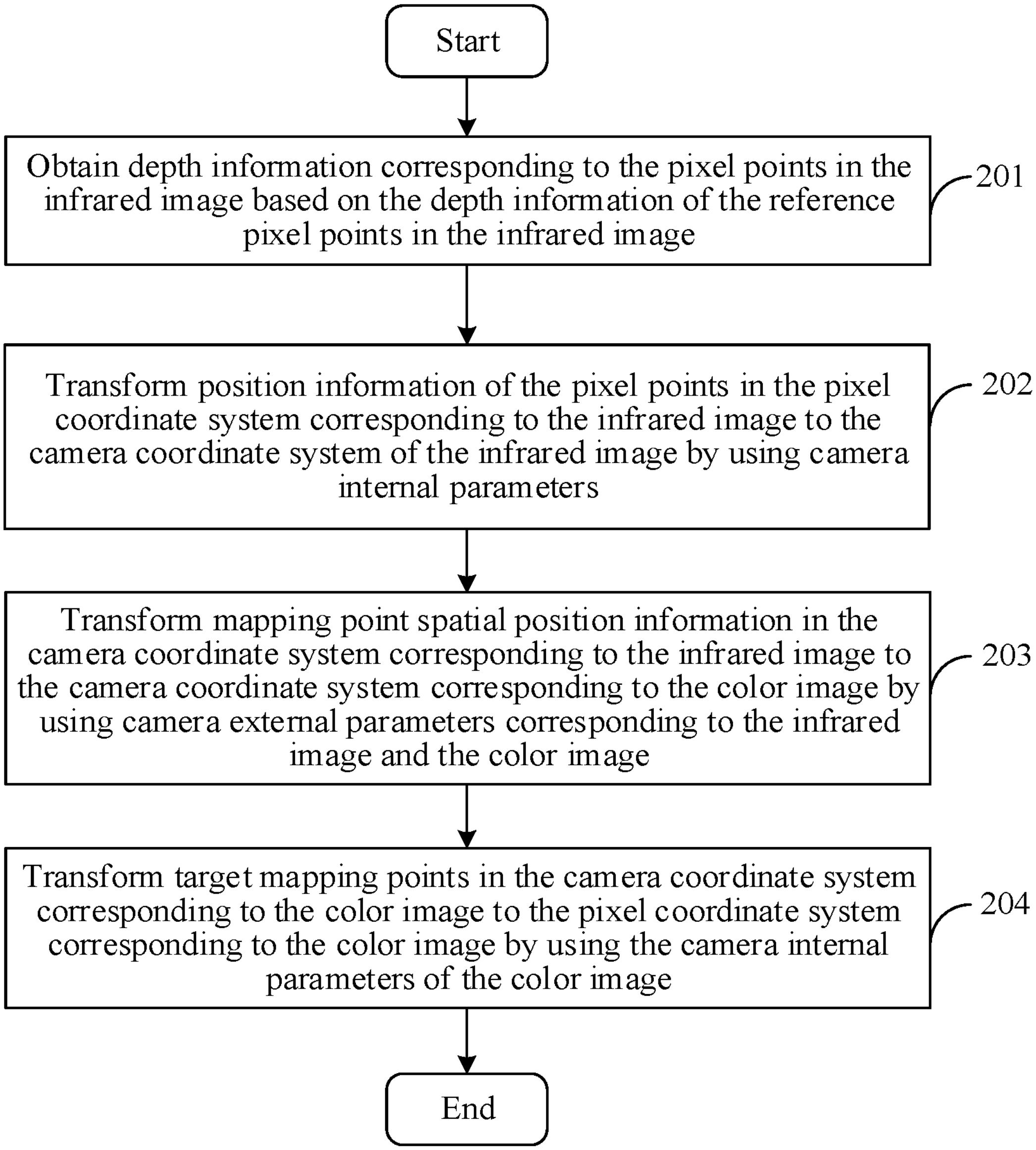
FIG. 1H is another flowchart of an object recognition method according to an embodiment of this application.

In a specific embodiment, FIG. 1H is a flowchart of pixel alignment on an infrared image and a visible image. Specifically, the flowchart includes: Step 201. Obtain depth information corresponding to the pixel points in the infrared image based on the depth information of the reference pixel points in the infrared image. Step 202. Transform position information of the pixel points in the pixel coordinate system corresponding to the infrared image to the camera coordinate system of the infrared image by using camera internal parameters of the camera sensor corresponding to the infrared image. Step 203. Transform mapping point spatial position information in the camera coordinate system corresponding to the infrared image to the camera coordinate system corresponding to the color image by using camera external parameters between the camera sensor corresponding to the infrared image and the camera sensor corresponding to the visible image. Step 204. Transform target mapping points in the camera coordinate system corresponding to the color image to the pixel coordinate system corresponding to the color image by using the camera internal parameters of the camera sensor corresponding to the visible image, to obtain a mapping result, thereby performing pixel alignment on the visible image and the infrared image based on the mapping result.

Step 106. Perform object recognition on the target object based on the aligned infrared image and visible image, to obtain an object recognition result of the target object.

After the alignment, living detection can be performed on the aligned infrared image, and after the living detection is successful, object recognition can be performed based on the aligned visible image. The object recognition may be specifically a technology of exchanging object identity information through biometric multimedia information. In some embodiments, related payment operations may also be performed based on the object recognition result.

In a specific scenario, such as the palmprint recognition scenario, performing object recognition on the target object may be specifically extracting palmprint information of the target object. After obtaining the palmprint information, the palmprint information can be matched with palmprint feature information stored in a preset palmprint information database, to determine the object identity of the target object. The preset palmprint information database may store a target mapping relationship set, and the target mapping relationship set includes mapping relationships between preset palmprint feature information and preset object identities. For example, the target mapping relationship set may be a relational table of preset palmprint feature information and preset object identities.

In some embodiments, a matching degree between the palmprint information and each preset palmprint feature information can be calculated, and target palmprint feature information can be determined from the preset palmprint feature information according to the matching degree. For example, the preset palmprint feature information with the highest matching degree with the palmprint information can be determined as the target palmprint feature information. Then, the object identity corresponding to the target palmprint feature information is determined as the object identity of the target object according to the target mapping relationship set.

As an example, a Euclidean distance between a palmprint line feature (for example, length or number of lines) of different palmprint information and a vectorized representation of a texture feature is calculated, and the reciprocal of the Euclidean distance is taken as a matching degree.

It can be learned from the above that in the embodiments of this application, the depth information of the pixel points is obtained from the infrared image and the depth information is given to the pixel points in the visible image through mapping between the infrared image and the visible image, so that 3D data including the depth information can be accurately restored through the low-cost images acquired by the sensors based on infrared light and visible light, so that subsequent object recognition can be performed. Because the cost of object recognition in hardware implementation level is reduced, it can be widely applied to various application scenarios requiring large-scale object recognition, such as intelligent transportation, compared with the solutions in the related art that rely on depth sensors for object recognition.

According to the method described in the above embodiment, the object recognition apparatus being specifically integrated in the terminal is used as an example for further detailed description below.

Figure 2:
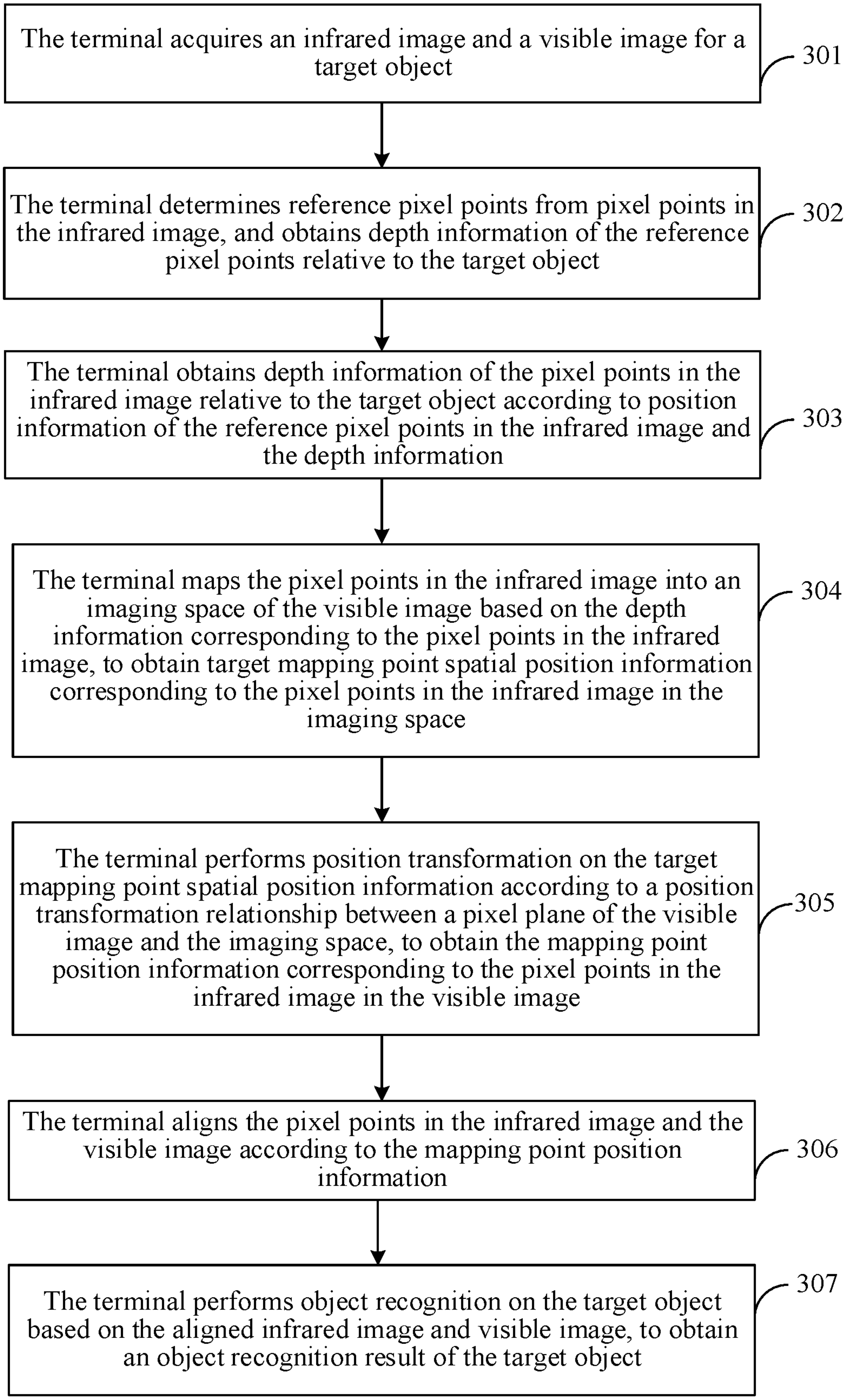
FIG. 2 is another flowchart of an object recognition method according to an embodiment of this application.

The embodiments of this application provide an object recognition method. As shown in FIG. 2, the specific process of the object recognition method may be as follows:

Step 301. The terminal acquires an infrared image and a visible image for a target object.

The target object may be an object requiring biometric recognition, which may be palmprint information corresponding to a human body or a human face. This is not limited in the embodiments of this application.

The infrared image may be specifically an infrared image imaged in pan-infrared light and acquired by an infrared sensor, and may be used for living detection on the target object. The visible image may be specifically a color image imaged by natural light and acquired by an image sensor, and may be used for identity recognition on the target object. In the embodiments of this application, the infrared image and the visible image for the target object may be acquired at the same time, so that the infrared image corresponds to the visible image.

Step 302. The terminal determines reference pixel points from pixel points in the infrared image, and obtains depth information of the reference pixel points relative to the target object.

In some embodiments, three pixel points that are not on the same line may be arbitrarily selected as reference pixel points from the pixel points in the infrared image.

In the embodiments of this application, the reference pixel points include at least three pixel points that are not on the same line.

In a specific scenario, the depth information of the reference pixel points relative to the target object may be specifically obtained by using a Psensor. Specifically, the number of the reference pixel points may be determined firstly, and the number of the Psensors may be determined based on the number of the reference pixel points. Each Psensor is configured to obtain the depth information of one reference pixel point. For the principle of measuring the depth information by the Psensor, reference may be made to dToF. dToF is to measure the distance directly according to the time difference between pulse emission and reception, while the Psensor can calculate the distance between the imaging plane and the object surface of the target object according to the round-trip time between the emitted light and the object surface and the propagation speed of light, and the distance is the depth information.

For example, when there is no depth camera, if the target object is planar (such as palm), a cheap Psensor can be used as an alternative to deduce the plane depth value of the target object, and three Psensors can be installed at positions not on the same line in the pixel plane of the infrared image, to obtain the depth information corresponding to three or more reference pixel points by using the Psensors.

Step 303. The terminal obtains depth information of the pixel points in the infrared image relative to the target object according to position information of the reference pixel points in the infrared image and the depth information.

In the embodiments of this application, the step of "obtaining depth information of the pixel points in the infrared image relative to the target object according to position information of the reference pixel points in the infrared image and the depth information includes" may include: determining mapping point spatial position information corresponding to the reference pixel points in an imaging space of the infrared image according to the position information of the reference pixel points in the infrared image and the depth information; constructing a plane calibration equation corresponding to the target object based on the mapping point spatial position information; and obtaining depth information of the pixel points in the infrared image relative to the target object according to the plane calibration equation and a position relationship between the pixel points in the infrared image and the reference pixel points.

For example, the step of "determining mapping point spatial position information corresponding to the reference pixel points in an imaging space of the infrared image according to the position information of the reference pixel points in the infrared image and the depth information" may include: performing position transformation on position information of the reference pixel points in the infrared image according to the position transformation relationship between the pixel plane of the infrared image and the imaging space, to obtain mapping point initial position information corresponding to the reference pixel points in the imaging space of the infrared image; and determining the mapping point spatial position information corresponding to the reference pixel points in the imaging space of the infrared image according to the depth information corresponding to the reference pixel points and the mapping point initial position information.

The position transformation relationship between the pixel plane of the infrared image and the imaging space may be specifically characterized by the camera internal parameters of the camera sensor corresponding to the infrared image. In the embodiments of this application, a pixel coordinate system corresponding to the infrared image can be constructed on the pixel plane of the infrared image, where the pixel coordinate system may be a two-dimensional coordinate system, and a camera coordinate system corresponding to the infrared image can be constructed in the imaging space of the infrared image, where the camera coordinate system may be a three-dimensional coordinate system.

The step of "constructing a plane calibration equation corresponding to the target object based on the mapping point spatial position information" may include: setting an initial plane calibration equation corresponding to the target object, where the initial plane calibration equation includes at least one calibration parameter; analyzing the at least one calibration parameter based on the mapping point spatial position information to obtain an analyzed calibration parameter; and updating the initial plane calibration equation according to the analyzed calibration parameter, to obtain the plane calibration equation corresponding to the target object.

The initial plane calibration equation may be set as $AX+BY+CZ+D=0$, where A, B, C, and D are calibration parameters. In the embodiments of this application, the mapping point spatial position information can be substituted into the initial plane calibration equation, to analyze the calibration parameters to obtain specific values of A, B, C, and D, that is, analyzed calibration parameters, thereby obtaining the plane calibration equation of the target object.

In the embodiments of this application, the step of "obtaining depth information of the pixel points in the infrared image relative to the target object according to the plane calibration equation and a position relationship between the pixel points in the infrared image and the reference pixel points" may include: performing interpolation operation on position information of the pixel points in the infrared image and the position information of the reference pixel points, to obtain a position relationship parameter between the pixel points in the infrared image and the reference pixel points; and determining the depth information of the pixel points in the infrared image relative to the target object according to the position relationship parameter and the plane calibration equation.

In the embodiments of this application, the step of "determining the depth information of the pixel points in the infrared image relative to the target object according to the position relationship parameter and the plane calibration equation" may include: performing interpolation operation on the mapping point spatial position information corresponding to the reference pixel points in the imaging space of the infrared image according to the position relationship parameter, to obtain mapping point initial position information corresponding to the pixel points in the infrared image in the imaging space of the infrared image; and determining the depth information of the pixel points in the infrared image relative to the target object according to the plane calibration equation and the mapping point initial position information.

Step 304. The terminal maps the pixel points in the infrared image into an imaging space of the visible image based on the depth information corresponding to the pixel points in the infrared image, to obtain target mapping point spatial position information corresponding to the pixel points in the infrared image in the imaging space.

In the embodiments of this application, the step of "mapping the pixel points in the infrared image to an imaging space of the visible image based on the depth information corresponding to the pixel points in the infrared image, to obtain target mapping point spatial position information corresponding to the pixel points in the infrared image in the imaging space" may include: obtaining mapping point spatial position information corresponding to the pixel points in the infrared image in an imaging space of the infrared image based on the depth information corresponding to the pixel points in the infrared image; and performing position transformation on the mapping point spatial position information according to a position transformation relationship between the imaging space of the infrared image and the imaging space of the visible image, to obtain the target mapping point spatial position information corresponding to the pixel points in the infrared image in the imaging space of the visible image.

The position transformation relationship between the imaging space of the infrared image and the imaging space of the visible image can be specifically characterized by camera external parameters between the camera sensor corresponding to the infrared image and the camera sensor corresponding to the visible image. In the embodiments of this application, a camera coordinate system corresponding to the infrared image can be constructed in the imaging space of the infrared image, and a camera coordinate system corresponding to the color image can be constructed in the imaging space of the visible image. Both of the two camera coordinate systems are three-dimensional coordinate systems.

In the embodiments of this application, the step of "obtaining mapping point spatial position information corresponding to the pixel points in the infrared image in an imaging space of the infrared image based on the depth information corresponding to the pixel points in the infrared image" may include: performing position transformation on position information of the pixel points in the infrared image according to the position transformation relationship between the pixel plane of the infrared image and the imaging space, to obtain mapping point initial position information corresponding to the pixel points in the infrared image in the imaging space of the infrared image; and determining the mapping point spatial position information corresponding to the pixel points in the infrared image in the imaging space of the infrared image according to the depth information corresponding to the pixel points in the infrared image and the mapping point initial position information.

The position transformation relationship between the pixel plane of the infrared image and the imaging space may be specifically characterized by the camera internal parameters of the camera sensor corresponding to the infrared image. In the embodiments of this application, a pixel coordinate system corresponding to the infrared image can be constructed on the pixel plane of the infrared image, where the pixel coordinate system may be a two-dimensional coordinate system, and a camera coordinate system corresponding to the infrared image can be constructed in the imaging space of the infrared image, where the camera coordinate system may be a three-dimensional coordinate system.

Step 305. The terminal performs position transformation on the target mapping point spatial position information according to a position transformation relationship between a pixel plane of the visible image and the imaging space, to obtain the mapping point position information corresponding to the pixel points in the infrared image in the visible image.

Step 306. The terminal aligns the pixel points in the infrared image and the visible image according to the mapping point position information.

Specifically, each pixel point in the infrared image can be aligned with a corresponding pixel point in the visible image based on the mapping point position information by using the visible image as a reference. That is, the pixel point in the infrared image is aligned with the position of the pixel point representing the same target object in the visible image, and the aligned infrared image corresponds to the position of the pixel point where the same target object is located in the visible image.

Step 307. The terminal performs object recognition on the target object based on the aligned infrared image and visible image, to obtain an object recognition result of the target object.

After the alignment, living detection can be performed on the aligned infrared image, and after the living detection is successful, object recognition can be performed based on the aligned visible image. The object recognition may be specifically a technology of exchanging object identity information through biometric multimedia information. In some embodiments, related payment operations may also be performed based on the object recognition result.

As can be learned from the above, in the embodiments of this application, the pixel alignment of the infrared image and the visible image can be implemented in the scenario lacking the depth map, thereby performing object recognition.

Figure 3:
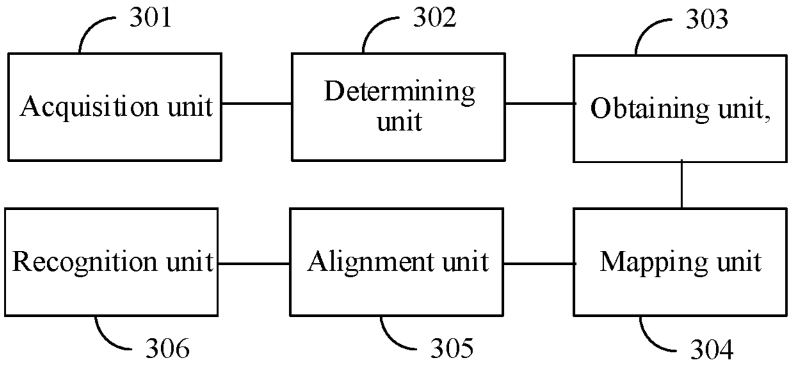
FIG. 3 is a schematic structural diagram of an object recognition apparatus according to an embodiment of this application.

The embodiments of this application further provide an object recognition apparatus. As shown in FIG. 3, the object recognition apparatus may include an acquisition unit 301, a determining unit 302, an obtaining unit 303, a mapping unit 304, an alignment unit 305, and a recognition unit 306.

(1) The acquisition unit 301 is configured to acquire an infrared image and a visible image for a target object.

(2) The determining unit 302 is configured to determine reference pixel points from pixel points in the infrared image, and obtain depth information of the reference pixel points relative to the target object.

In some embodiments of this application, the reference pixel points include at least three pixel points that are not on the same line.

(3) The obtaining unit 303 is configured to obtain depth information of the pixel points in the infrared image relative to the target object according to position information of the reference pixel points in the infrared image and the depth information.

In some embodiments of this application, the obtaining unit may include a determining subunit, a construction subunit, and an obtaining subunit, as follows: The determination subunit is configured to determine mapping point spatial position information corresponding to the reference pixel points in an imaging space of the infrared image according to the position information of the reference pixel points in the infrared image and the depth information. The construction subunit is configured to construct a plane calibration equation corresponding to the target object based on the mapping point spatial position information.

The obtaining subunit is configured to obtain depth information of the pixel points in the infrared image relative to the target object according to the plane calibration equation and a position relationship between the pixel points in the infrared image and the reference pixel points.

In some embodiments of this application, the obtaining subunit may be specifically configured to: perform interpolation operation on the position information of the pixel points in the infrared image and the position information of the reference pixel points to obtain a position relationship parameter between the pixel points in the infrared image and the reference pixel points; and determine depth information of the pixel points in the infrared image relative to the target object according to the position relationship parameter and the plane calibration equation.

(4) The mapping unit 304 is configured to perform position mapping on the pixel points in the infrared image based on the depth information corresponding to the pixel points in the infrared image to obtain mapping point position information corresponding to the pixel points in the infrared image in the visible image.

In some embodiments of this application, the mapping unit may include a mapping subunit and a position transformation subunit, as follows: The mapping subunit is configured to map pixel points in the infrared image to an imaging space of the visible image based on the depth information corresponding to the pixel points in the infrared image to obtain target mapping point spatial position information corresponding to the pixel points in the infrared image in the imaging space. The position transformation subunit is configured to perform position transformation on the target mapping point spatial position information according to a position transformation relationship between a pixel plane of the visible image and the imaging space, to obtain the mapping point position information corresponding to the pixel points in the infrared image in the visible image.

In some embodiments of this application, the mapping subunit may be specifically configured to obtain mapping point spatial position information corresponding to the pixel points in the infrared image in the imaging space of the infrared image based on the depth information corresponding to the pixel points in the infrared image; and performing position transformation on the mapping point spatial position information according to the position transformation relationship between the imaging space of the infrared image and the imaging space of the visible image, to obtain the target mapping point spatial position information corresponding to the pixel points in the infrared image in the imaging space of the visible image.

(5) The alignment unit 305 is configured to align the pixel points in the infrared image and the visible image according to the mapping point position information.

(6) The recognition unit 306 is configured to perform object recognition on the target object based on the aligned infrared image and visible image, to obtain an object recognition result of the target object.

Figure 4:
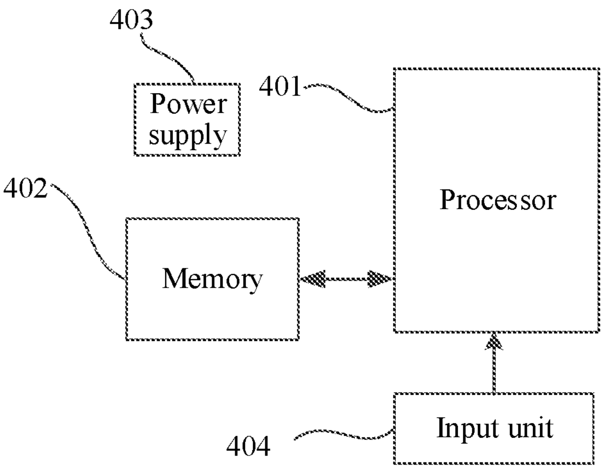
FIG. 4 is a schematic structural diagram of an electronic device according to an embodiment of this application.

An embodiment of this application further provides an electronic device. FIG. 4 shows a schematic structural diagram of the electronic device related to the embodiments of this application. The electronic device may be a terminal, a server, or the like. The electronic device may include components such as a processor 401 with one or more processing cores, a memory 402 with one or more computer-readable storage media, a power supply 403, and an input unit 404. A person skilled in the art may understand that the electronic device structure shown in FIG. 4 does not constitute a limit to the electronic device. The server may include more or fewer components than those shown in the figure, may combine some components, or may have different component arrangements The processor 401 is a control center of the electronic device, which is connected to various parts of the entire electronic device by using various interfaces and lines, and by running or executing a software program and/or module stored in the memory 402 and calling data stored in the memory 402, to implement various functions of the electronic device and process data. For example, the processor 401 may include one or more processing cores. For example, the processor 401 may integrate an application processor and a modem. The application processor mainly processes an operating system, a user interface, an application program, and the like. The modem mainly processes wireless communication. It can be understood that the modem may also not be integrated into the processor 708.

The memory 402 may be configured to store a software program and module. The processor 401 runs the software program and module stored in the memory 402, to implement various functional applications and data processing. The memory 402 may mainly include a program storage area and a data storage area. The program storage area may store an operating system, an application program required by at least one function (for example, a sound playing function and an image playing function), or the like. The storage data area may store data created according to the use of the electronic device.

Although not shown in the figure, the electronic device may further include a display unit, and the like. Details are not described herein again. Specifically, in this embodiment of this application, the processor 401 in the electronic device loads one or more executable files corresponding to processes of one or more application programs into the memory 402 according to the following instructions, and the processor 401 runs the application programs stored in the memory 402 to implement the foregoing object recognition method of the embodiments of this application. For specific implementations of the above operations, reference may be made to the foregoing embodiments. Details are not described herein again.

A person of ordinary skill in the art may understand that, all or some steps of the methods in the foregoing embodiments may be implemented by using instructions, or implemented through instructions controlling relevant hardware, and the instructions may be stored in a computer-readable memory and loaded and executed by a processor.

An embodiment of this application provides a storage medium, storing a plurality of instructions, the instructions being loaded by a processor, to perform the steps in any object recognition method provided by the embodiments of this application. For specific implementations of the above operations, reference may be made to the foregoing embodiments. Details are not described herein again. The computer-readable storage medium may include: a read-only memory (ROM), a random access memory (RAM), a magnetic disk, an optical disc, or the like.

An embodiment of this application further provides a computer program product or computer program including computer instructions, the computer instructions being stored in a non-transitory computer-readable storage medium. A processor of a computer device reads the computer instructions from the computer-readable storage medium, and the processor executes the computer instructions so that the computer device performs the methods provided in various implementations of the object recognition aspects described above.

In this application, the term “module” or “unit” in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. The object recognition method and related equipment provided by the embodiments of this application are introduced above in detail. In this specification, the principles and implementations of this application are described by applying specific examples, and the description of the above embodiments is only used to help understand the method and core idea of this application. Meanwhile, for a person skilled in the art, there will be changes in the specific implementation and application scope according to the idea of this application. In summary, the content of this specification is not to be understood as limiting this application.

What is claimed is:

1. An object recognition method performed by an electronic device, the method comprising:

simultaneously acquiring an infrared image and a visible image for a target object;

determining reference pixel points from pixel points in the infrared image, and obtaining depth information of the reference pixel points in the infrared image relative to the target object;

determining mapping point spatial position information corresponding to the reference pixel points in an imaging space of the infrared image according to the position information of the reference pixel points in the infrared image and the depth information;

constructing a plane calibration equation corresponding to the target object based on the mapping point spatial position information;

performing interpolation operation on position information of other pixel points in the infrared image and the position information of the reference pixel points, to obtain a position relationship parameter between the other pixel points in the infrared image and the reference pixel points;

determining depth information of the other pixel points in the infrared image relative to the target object using the position relationship parameter and the plane calibration equation;

aligning the pixel points in the infrared image with pixel points in the visible image based on the depth information of the reference pixel points and the depth information of the other pixel points in the infrared image; and performing object recognition on the target object based on the aligned infrared image and visible image, to obtain an object recognition result of the target object.

2. The method according to claim 1, wherein the aligning the pixel points in the infrared image with pixel points in the visible image based on the depth information of the reference pixel points and the depth information of the other pixel points in the infrared image comprises:

obtaining, within the visible image, mapping point position information corresponding to the pixel points in the infrared image based on the depth information of the reference pixel points and the depth information of the other pixel points in the infrared image; and aligning the pixel points in the infrared image with pixel points in the visible image according to the mapping point position information.

3. The method according to claim 2, wherein the obtaining, within the visible image, mapping point position information corresponding to the pixel points in the infrared image on the pixel points in the infrared image based on the depth information of the reference pixel points and the depth information of the other pixel points in the infrared image comprises:

mapping the pixel points in the infrared image to an imaging space of the visible image based on the depth information of the reference pixel points and the depth information of the other pixel points in the infrared image, to obtain target mapping point spatial position information corresponding to the pixel points in the infrared image in the imaging space; and performing position transformation on the target mapping point spatial position information according to a position transformation relationship between a pixel plane of the visible image and the imaging space, to obtain the mapping point position information corresponding to the pixel points in the infrared image in the visible image.

4. The method according to claim 3, wherein the mapping the pixel points in the infrared image to an imaging space of the visible image based on the depth information of the reference pixel points and the depth information of the other pixel points in the infrared image, to obtain target mapping point spatial position information corresponding to the pixel points in the infrared image in the imaging space comprises:

obtaining mapping point spatial position information corresponding to the pixel points in the infrared image in an imaging space of the infrared image based on the depth information of the reference pixel points and the depth information of the other pixel points in the infrared image; and performing position transformation on the mapping point spatial position information according to a position transformation relationship between the imaging space of the infrared image and the imaging space of the visible image, to obtain the target mapping point spatial position information corresponding to the pixel points in the infrared image in the imaging space of the visible image.

5. The method according to claim 1, wherein the reference pixel points comprise at least three pixel points that are not on the same line.

6. The method according to claim 1, wherein the aligning the pixel points in the infrared image with pixel points in the visible image based on the depth information of the reference pixel points and the depth information of the other pixel points in the infrared image comprises:

maintaining coordinates of the pixel points in the visible image unchanged in a pixel coordinate system, and moving a position of the infrared image in the pixel coordinate system in at least one movement mode of rotation and translation, wherein coordinates of pixel points of the moved infrared image are the same as those of the pixel points representing the same target object in the visible image.

7. An electronic device, comprising a memory and a processor, the memory storing a plurality of instructions that, when executed by the processor, cause the electronic device to perform an object recognition method including:

simultaneously acquiring an infrared image and a visible image for a target object;

determining reference pixel points from pixel points in the infrared image, and obtaining depth information of the reference pixel points in the infrared image relative to the target object;

determining mapping point spatial position information corresponding to the reference pixel points in an imaging space of the infrared image according to the position information of the reference pixel points in the infrared image and the depth information;

constructing a plane calibration equation corresponding to the target object based on the mapping point spatial position information;

performing interpolation operation on position information of other pixel points in the infrared image and the position information of the reference pixel points, to obtain a position relationship parameter between the other pixel points in the infrared image and the reference pixel points;

determining depth information of the other pixel points in the infrared image relative to the target object using the position relationship parameter and the plane calibration equation;

aligning the pixel points in the infrared image with pixel points in the visible image based on the depth information of the reference pixel points and the depth information of the other pixel points in the infrared image; and performing object recognition on the target object based on the aligned infrared image and visible image, to obtain an object recognition result of the target object.

8. The electronic device according to claim 7, wherein the aligning the pixel points in the infrared image with pixel points in the visible image based on the depth information of the reference pixel points and the depth information of the other pixel points in the infrared image comprises:

obtaining, within the visible image, mapping point position information corresponding to the pixel points in the infrared image based on the depth information of the reference pixel points and the depth information of the other pixel points in the infrared image; and aligning the pixel points in the infrared image with pixel points in the visible image according to the mapping point position information.

9. The electronic device according to claim 8, wherein the obtaining, within the visible image, mapping point position information corresponding to the pixel points in the infrared image on the pixel points in the infrared image based on the depth information of the reference pixel points and the depth information of the other pixel points in the infrared image comprises:

mapping the pixel points in the infrared image to an imaging space of the visible image based on the depth information of the reference pixel points and the depth information of the other pixel points in the infrared image, to obtain target mapping point spatial position information corresponding to the pixel points in the infrared image in the imaging space; and performing position transformation on the target mapping point spatial position information according to a position transformation relationship between a pixel plane of the visible image and the imaging space, to obtain the mapping point position information corresponding to the pixel points in the infrared image in the visible image.

10. The electronic device according to claim 9, wherein the mapping the pixel points in the infrared image to an imaging space of the visible image based on the depth information of the reference pixel points and the depth information of the other pixel points in the infrared image, to obtain target mapping point spatial position information corresponding to the pixel points in the infrared image in the imaging space comprises:

obtaining mapping point spatial position information corresponding to the pixel points in the infrared image in an imaging space of the infrared image based on the depth information of the reference pixel points and the depth information of the other pixel points in the infrared image; and performing position transformation on the mapping point spatial position information according to a position transformation relationship between the imaging space of the infrared image and the imaging space of the visible image, to obtain the target mapping point spatial position information corresponding to the pixel points in the infrared image in the imaging space of the visible image.

11. The electronic device according to claim 7, wherein the reference pixel points comprise at least three pixel points that are not on the same line.

12. The electronic device according to claim 7, wherein the aligning the pixel points in the infrared image with pixel points in the visible image based on the depth information of the reference pixel points and the depth information of the other pixel points in the infrared image comprises:

maintaining coordinates of the pixel points in the visible image unchanged in a pixel coordinate system, and moving a position of the infrared image in the pixel coordinate system in at least one movement mode of rotation and translation, wherein coordinates of pixel points of the moved infrared image are the same as those of the pixel points representing the same target object in the visible image.

13. A non-transitory computer-readable storage medium, storing a plurality of instructions that, when executed by a processor of an electronic device, cause the electronic device to perform an object recognition method including:

simultaneously acquiring an infrared image and a visible image for a target object;

determining reference pixel points from pixel points in the infrared image, and obtaining depth information of the reference pixel points in the infrared image relative to the target object;

determining mapping point spatial position information corresponding to the reference pixel points in an imaging space of the infrared image according to the position information of the reference pixel points in the infrared image and the depth information;

constructing a plane calibration equation corresponding to the target object based on the mapping point spatial position information;

performing interpolation operation on position information of other pixel points in the infrared image and the position information of the reference pixel points, to obtain a position relationship parameter between the other pixel points in the infrared image and the reference pixel points;

determining depth information of the other pixel points in the infrared image relative to the target object using the position relationship parameter and the plane calibration equation;

aligning the pixel points in the infrared image with pixel points in the visible image based on the depth information of the reference pixel points and the depth information of the other pixel points in the infrared image; and performing object recognition on the target object based on the aligned infrared image and visible image, to obtain an object recognition result of the target object.

14. The non-transitory computer-readable storage medium according to claim 13, wherein the aligning the pixel points in the infrared image with pixel points in the visible image based on the depth information of the reference pixel points and the depth information of the other pixel points in the infrared image comprises:

obtaining, within the visible image, mapping point position information corresponding to the pixel points in the infrared image based on the depth information of the reference pixel points and the depth information of the other pixel points in the infrared image; and aligning the pixel points in the infrared image with pixel points in the visible image according to the mapping point position information.

15. The non-transitory computer-readable storage medium according to claim 13, wherein the reference pixel points comprise at least three pixel points that are not on the same line.

16. The non-transitory computer-readable storage medium according to claim 13, wherein the aligning the pixel points in the infrared image with pixel points in the visible image based on the depth information of the reference pixel points and the depth information of the other pixel points in the infrared image comprises:

maintaining coordinates of the pixel points in the visible image unchanged in a pixel coordinate system, and moving a position of the infrared image in the pixel coordinate system in at least one movement mode of rotation and translation, wherein coordinates of pixel points of the moved infrared image are the same as those of the pixel points representing the same target object in the visible image.

* * * * *